United States Patent
Lu

(10) Patent No.: US 7,882,353 B2
(45) Date of Patent: *Feb. 1, 2011

(54) METHOD FOR PROTECTING DATA IN A HARD DISK

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 1014 days.

This patent is subject to a terminal disclaimer.

(21) Appl. No.: 11/709,859

(22) Filed: Feb. 23, 2007

(65) Prior Publication Data

US 2008/0209200 A1 Aug. 28, 2008

(51) Int. Cl.
*H04L 29/00* (2006.01)

(52) U.S. Cl. .................... 713/164; 711/173; 713/193

(58) Field of Classification Search ........................ None
See application file for complete search history.

(56) References Cited

U.S. PATENT DOCUMENTS 6,615,365 B1 * 9/2003 Jenevein et al. ............... 714/6
7,310,704 B1 * 12/2007 Wen et al. ................... 711/114

* cited by examiner

*Primary Examiner*—Minh Dinh
*Assistant Examiner*—Venkat Perungavoor
(74) *Attorney, Agent, or Firm*—Bacon & Thomas, PLLC

(57) ABSTRACT

The present invention discloses a method for protecting data in a hard disk, which is applied to the hard disk, such that if a computer executes boot codes of the hard disk and a hard disk identification code recorded by the hard disk is determined to be identical to a computer identification code stored in a computer, the hard disk can be read, which subsequently allows an operating system to be initialized, or else the content in a partition table area will be cleared and the hard disk cannot be read, thus the initialization of the operating system cannot be completed.

17 Claims, 9 Drawing Sheets

METHOD FOR PROTECTING DATA IN A HARD DISK

FIELD OF THE INVENTION

The invention relates to a method for protecting data in a hard disk, and more particularly, to a method for protecting data in a hard disk that applies protective measures to the hard disk itself.

BACKGROUND OF THE INVENTION

In a technologically advanced world where the electronic industry booms today, a diversity of hi-tech electronic products related to computers has been developed and introduced rapidly, which has made major breakthrough in the development of technology. As various current electronic technologies are improved constantly, performance of the computer systems has become stronger, but these computer systems are usually equipped with at least a hard disk. Regardless of whether the hard disk is equipped with the function of initializing the operating system thereof, every single hard disk has a master boot sector (which is stored in Cylinder 0, Head 0, Sector 1 of the hard disk according to the rule of the computer industry, and is the foremost sector of the hard disk), the content stored within the master boot sector is called the Master Boot Record (or MBR). The MBR includes a Jump Area, a MBR Boot Code Area, a Partition Table Area, and an End Area. The Jump Area contains the starting position of the MBR Boot Code Area of the designated hard disk; the Partition Table Area is where the partition tables are stored, and the partition tables contain the information about the partition status of the hard disk and data distribution, whereas the End Area signifies the end of the MBR (which is represented by two bytes; AA 55). When the hard disk is set to initiate a master hard disk under an operating system, a boot code within the MBR Boot Code Area is used to complete the initialization of the computer. As such, the computer system is allowed to access the important data and relevant parameters stored in the hard disk.

For the methods available for computers to protect the data of hard disk, a password-protected program is usually installed in an operating system in the master hard disk of the computer system (such as the OS administrator password). Before initiating the operating system, the computer will always execute the password-protected program, so that no one is allowed to enter the operating system unless the password-protected program has received the correct password. Subsequently, the computer is allowed to access the data of the hard disk by using the coding and decoding programs of the operating system; if the password-protected program does not receive the correct password, the computer cannot enter the operating system and access the data of hard disk, and thus the data of the hard disk is protected.

However, if the password recognized by the password-protected program is hacked or stolen, or if the hard disk of the computer system is stolen and directly installed into another computer and booted, the other computer can still access the data of the hard disk. The hard disk does not have any other protective measures at this stage, and the important data of the hard disk would be open to theft by anyone. In other words, the protection for current hard disks is not thorough enough, thus rendering the data security of current hard disks insufficient.

SUMMARY OF THE INVENTION

In light of the problem of current hard disks, which allows anyone to access the data therein after installing the hard disks to any computer systems and completing the initialization of the operating system, a method for protecting data in a hard disk is disclosed in this invention.

The major objective of the invention is to propose a method for protecting data in a hard disk, which is applied to hard disks; when a computer executes the boot code of the MBR in the hard disk, and determines a hard disk identification code recorded in the hard disk is different from a computer identification code of the computer, the content of the partition table area in the MBR is cleared, thus making the hard disk unreadable, and the operating system cannot be initialized. In contrast, if the hard disk identification code recorded in the hard disk is identical to the computer identification code of the computer, the operating system can be successfully initialized, consequently making the hard disk readable. Therefore, if the hard disk is stolen and installed to another computer, because the computer identification code of the other computer would be surely different from the hard disk identification code, all other computers would be unable to read the hard disk and complete the initialization of operating system. As a result, the data of the hard disks can be successfully safeguarded.

BRIEF DESCRIPTION OF DRAWINGS

The foregoing aspects, as well as many of the attendant advantages and features of this invention will become more apparent by reference to the following detailed description, when taken in conjunction with the accompanying drawings, wherein.

DETAILED DESCRIPTION OF PREFERRED EMBODIMENTS

Figure 1:
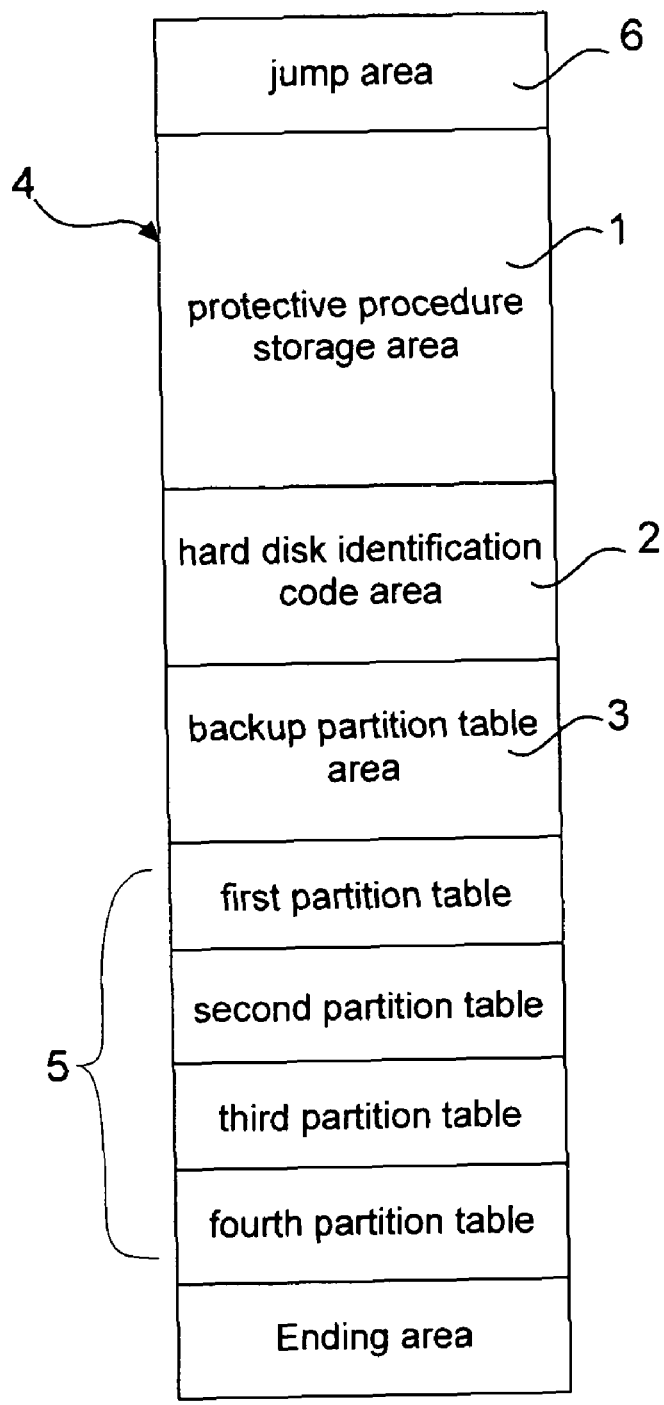
FIG. 1 shows the master boot sector according to the invention.
Figure 2:
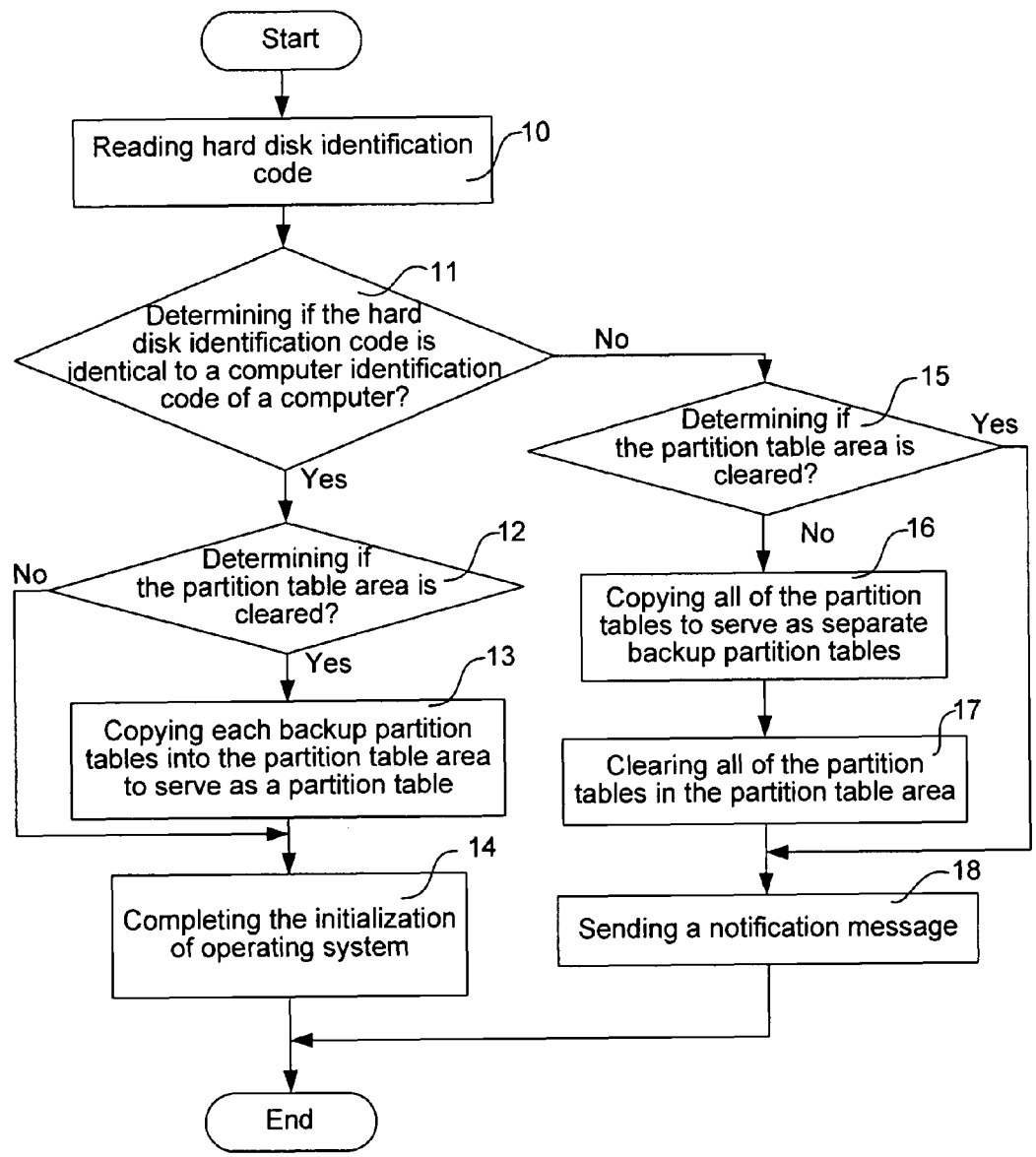
FIG. 2 shows the steps of the method according to the invention.

The invention discloses a method for protecting data in a hard disk, as shown in FIG. 1 and FIG. 2. The method is applied to a hard disk, and once the hard disk is set as protected, it is allocated with a protective procedure storage area 1, a hard disk identification code area 2, and a backup partition table area 3 in advance. After computer has run through BIOS, it reads the protective procedure stored in the protective procedure storage area 1 first, and then carries out the steps specified in the protective procedure; the steps of the protective procedure comprise:

(10) reading the hard disk identification code stored in the hard disk identification code area 2 in advance;

(11) determining if the hard disk identification code is identical to a computer identification code specified by the computer; if it is, the process moves on to step (12); if it is not, it moves on to step (15): in this invention, the computer identification code can be a value from the universal unique identification field (UUID) of type 1 System Management BIOS (SMBIOS);

(12) determining if partition table area 5 within a master boot sector 4 (Cylinder 0, Head 0, Sector 1 of the hard disk, which is the foremost sector in the hard disk) of the hard disk is empty (that is, there is no partition table in partition table area 5); if it is, the step (13) is carried out; if it is not, the step (14) is carried out instead;

(13) copying each of backup partition tables stored in the backup partition table area 3 in advance into the partition table area 5 to serve as separate partition tables; in this invention, each of the backup partition tables is copied from all of the partition tables stored in the partition table area 5 of the master boot sector 4 before the hard disk is protected, thus the purpose of copying each of the backup partition tables into the partition table area 5 is to restore partition table area 5 to its original state;

(14) subsequently proceeding according to the boot code within the master boot sector 4 (the boot code is used to load and execute the programming in the boot sector of hard disk partitions) to complete the initialization of the operating system and finish the overall process; the step of the computer executing the boot code in order to read partition tables and initialize the operating system can be found in prior arts, and thus will not be further described here;

(15) determining if the partition table area 5 is cleared and empty; if it is, the step (18) is carried out; if it is not, the step (16) is carried out instead.

(16) copying all of the partition tables currently in the partition table area 5 to prepare them as backup partition tables in the backup partition table area 3;

(17) clearing all of the partition tables in the partition table area 5;

(18) sending out a message notifying the absence of partition tables in the partition table area 5 and finishing the process, according to the boot code. The step of the computer executing the boot code and sending out a message notifying the absence of partition tables in the partition table area 5 can be found in prior arts, and thus will not be further described here.

From the description above, it can be noted that only when the hard disk identification code of the hard disk is identical to the computer identification code, can partition tables be stored into the partition table area 5 of the hard disk, and consequently allowing the computer to read each of the partition tables and complete the booting process. Otherwise, the partition table area 5 of the hard disk would be cleared, which prevents the computer from initializing the operating system, and thus achieving the aim of protecting the data in the hard disk.

Figure 3:
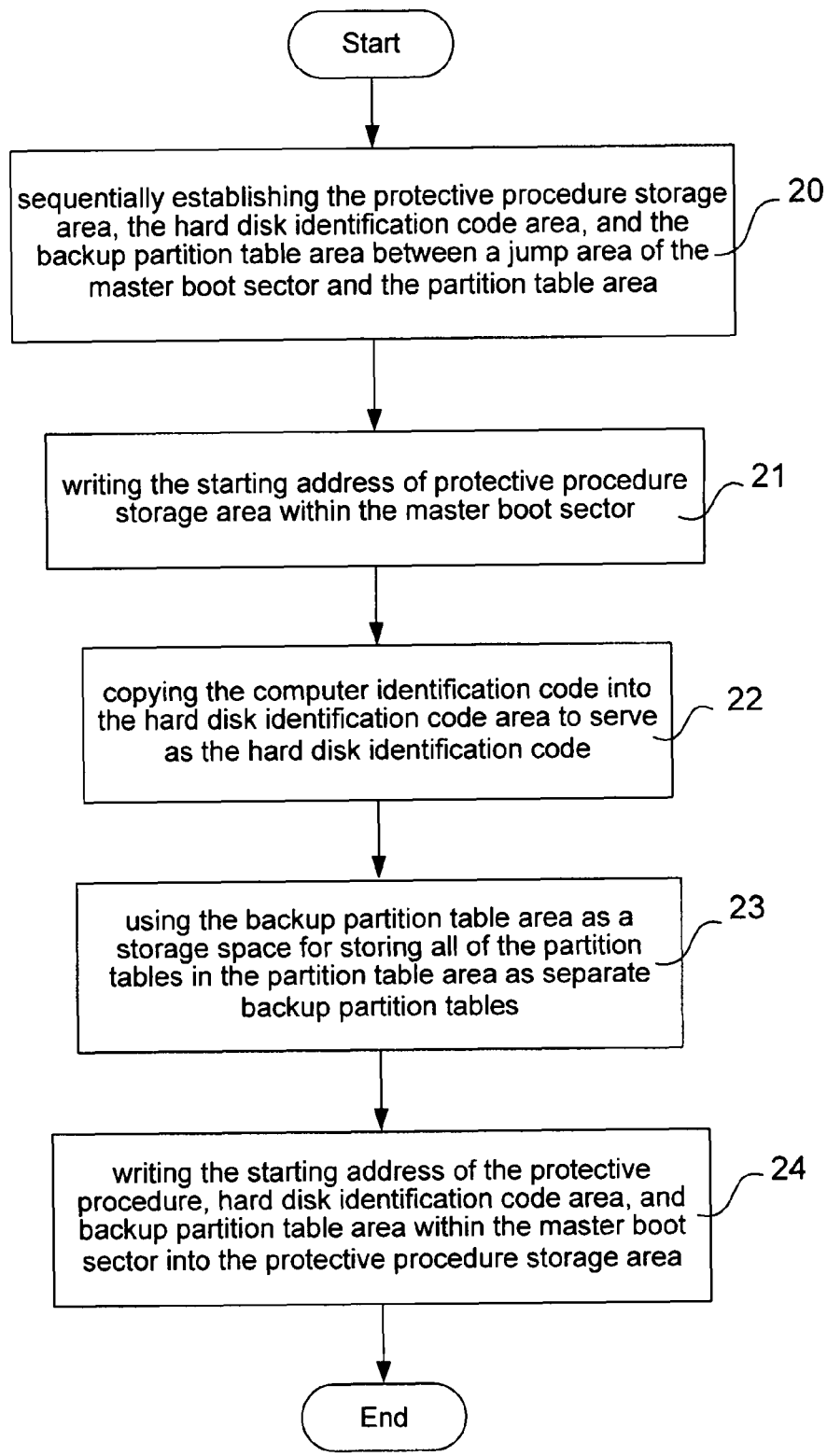
FIG. 3 shows the steps in setting hard disk protection according to an embodiment of the invention.

Because the hard disk is set as protected, it must be allocated with the hard disk identification code area 2, the protective procedure storage area 1, and the backup partition table area 3 before it can continue according to the aforesaid protective procedure and achieve the protection of data in the hard disk. Therefore, in a preferred embodiment of the invention, as shown in FIG. 3, the step of the computer setting the hard disk as protected, and then allocating it with the hard disk identification code area 2, the protective procedure storage area 1, and the backup partition table area 3, comprising:

(20) sequentially establishing the protective procedure storage area 1, the hard disk identification code area 2, and the backup partition table area 3 (as shown in FIG. 1) between a jump area 6 of the master boot sector 4 and the partition table area 5, which is originally the storage space used by the master boot sector 4 for storing the boot code;

(21) writing a jmp command into the jump area 6, and the command will jump to the starting address of protective procedure storage area 1 within the master boot sector 4;

(22) copying the identification code into the hard disk identification code area 2 to serve as the hard disk identification code;

(23) using the backup partition table area 3 as a storage space for storing all of the partition tables in the partition table area 5 as each of backup partition tables;

(24) writing the starting address of the protective procedure, hard disk identification code area 2, and backup partition table area 3 within the master boot sector 4 into the protective procedure storage area 1, and finishing the overall process.

In this embodiment, the step in which the computer reads the protective procedure is as follows: the computer reads and executes the command of jump area 6 first, which allows it to jump to the starting address of the protective procedure storage area 1 within the master boot sector 4, thereby reading and executing the protective procedure. In addition, when the computer is executing the protective procedure, it reads the starting address of the hard disk identification code area 2 and backup partition table area 3 within the master boot sector 4, which is written in the protective procedure storage area 1, and then obtains the hard disk identification code and each of the backup partition tables.

Figure 4:
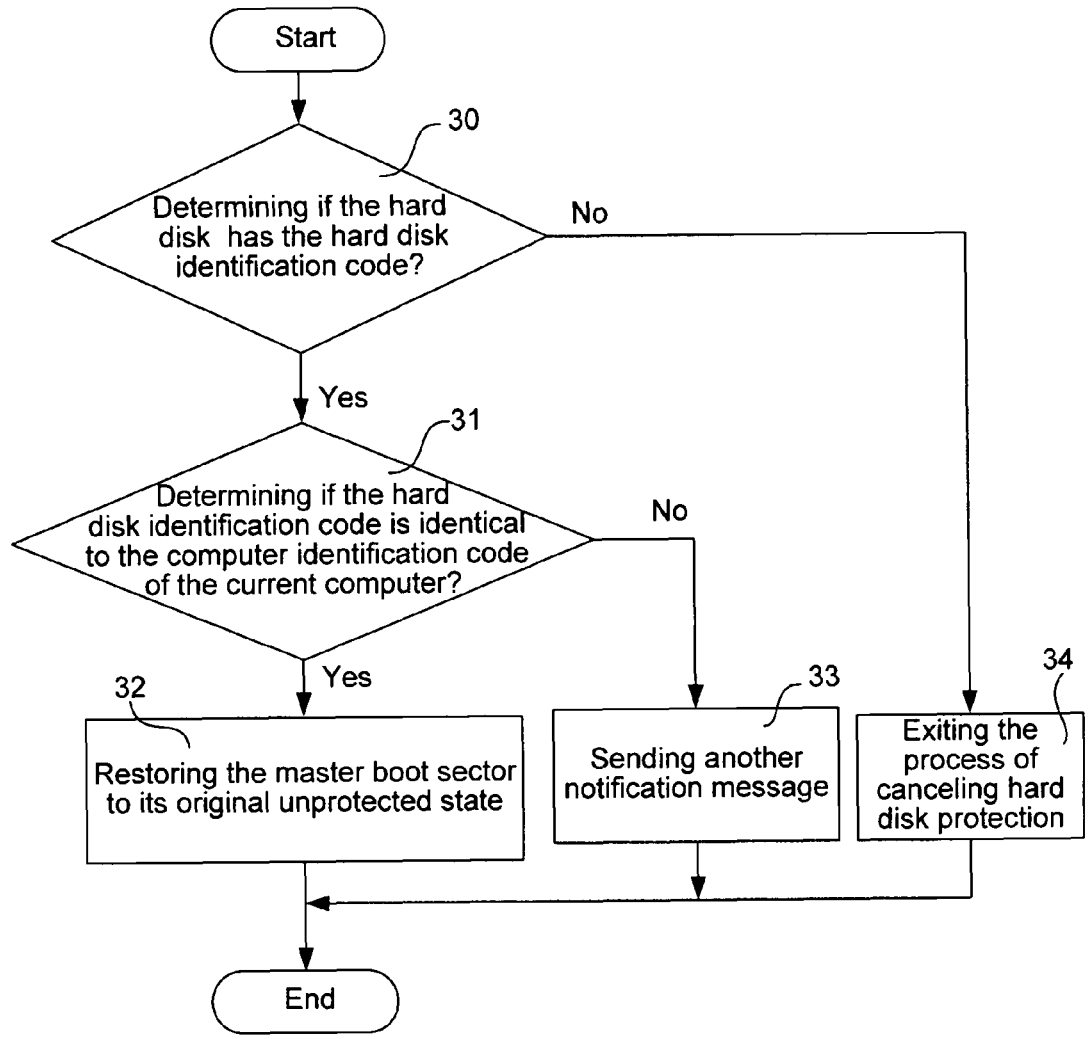
FIG. 4 shows the steps in canceling hard disk protection according to an embodiment of the invention.

Referring to the embodiment shown in FIG. 4, the step of the computer canceling hard disk protection after the hard disk is set as protected according to application program is comprised of:

(30) determining if the hard disk has the hard disk identification code; if it is, the step (31) is carried out; otherwise the step (34) is carried out instead;

(31) determining if the hard disk identification code is identical to the computer identification code of current computer; if it is, the step (32) is carried out; otherwise the step (33) is carried out instead;

(32) copying each of backup partition tables of backup partition table area 3 back into the partition table area 5 to restore the partition table area 5 to its original state, and clear the protective procedure storage area 1, hard disk identification code area 2, and backup partition table area 3, as well as keeping the boot code; in other words, the master boot sector 4 is restored to its original unprotected state; and then finishing the overall process;

(33) sending another message notifying the clearing of the protective procedure storage area 1, hard disk identification code area 2, and backup partition table area 3 of the master boot sector 4 is not allowed, and then finishing the overall process;

(34) exiting the process of canceling hard disk protection, and then finishing the overall process.

From the embodiment described above, it can be seen that the storage space within the master boot sector 4 that was originally intended for storing the boot code (i.e. step 14) is allocated with the hard disk identification code area 2, protective procedure storage area 1, and backup partition table area 3. When the hard disk is unprotected or its protection is cancelled, the original boot code of the master boot sector 4 is restored. In other words, the original boot code of the master boot sector 4 is used to complete the initialization of the operating system. In contrast, when the hard disk is protected, the computer reads and executes the command of the jump area 6, and jumps to the starting address of the protective procedure within the master boot sector 4, so as to make the hard disk being executed according to the protective procedure, thereby fulfilling the purpose of protecting the data of hard disk.

Figure 5:
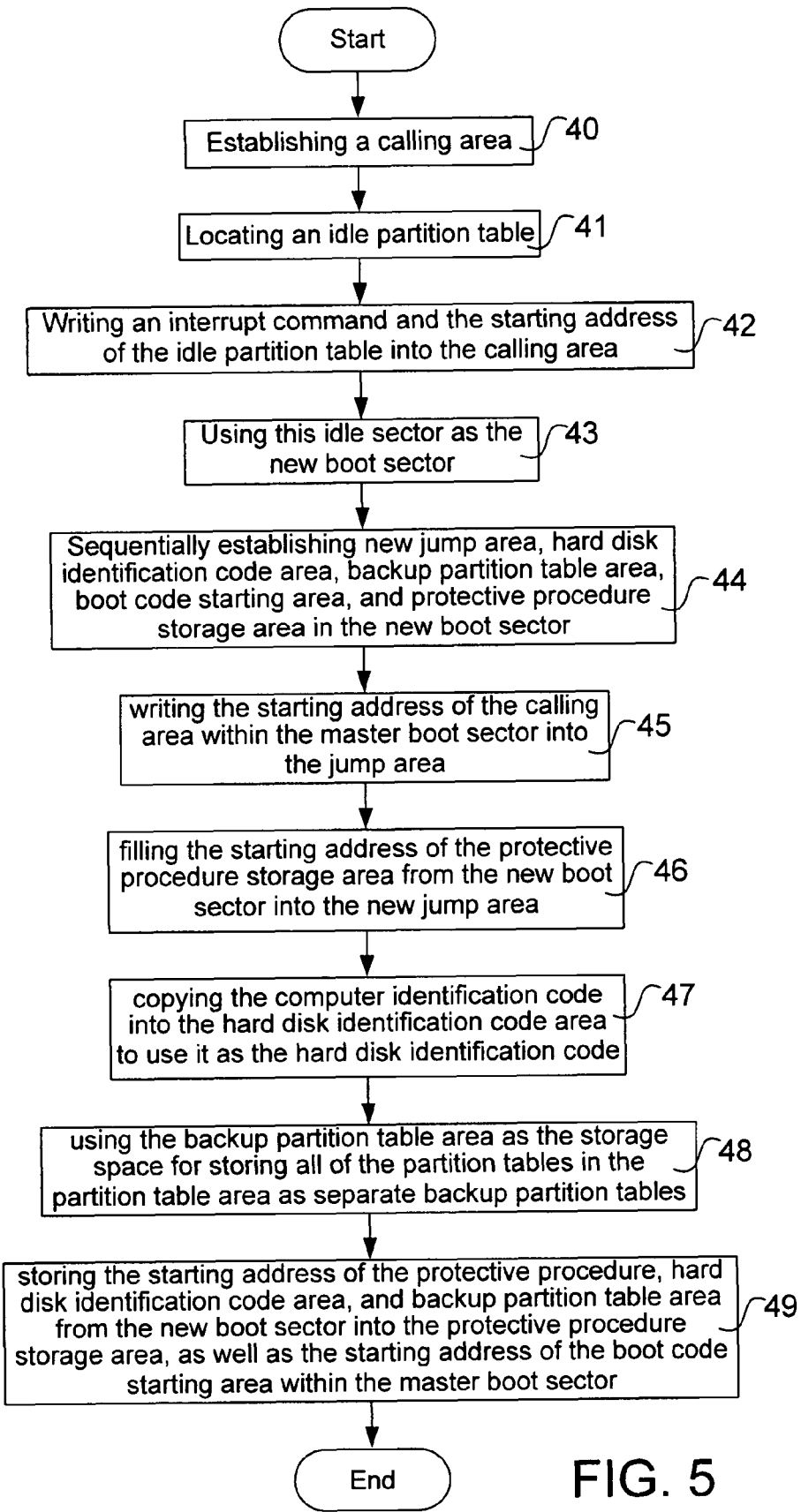
FIG. 5 shows the steps in setting hard disk protection according to another embodiment of the invention.
Figure 6:
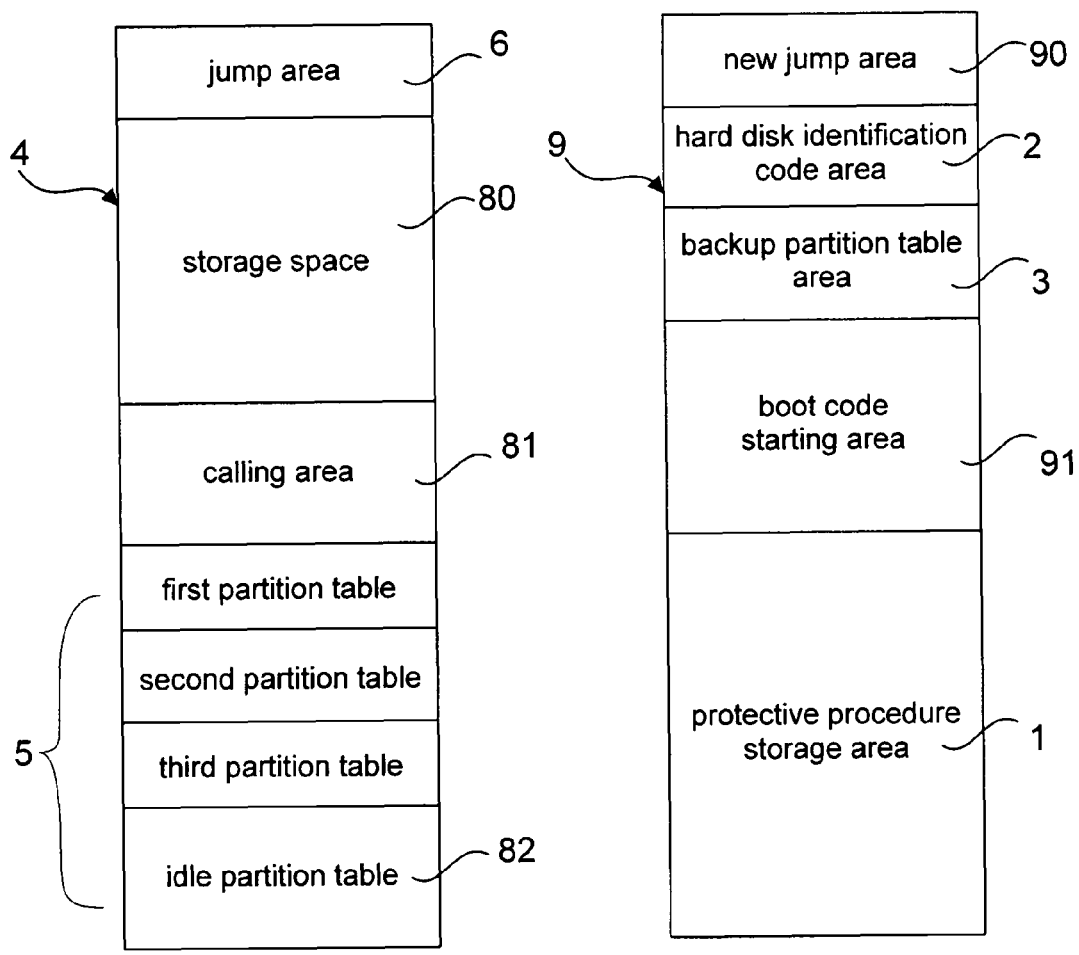
FIG. 6 shows the master boot sector and new boot sector according to another embodiment of the invention.

In the embodiment described above, the computer uses the space within the master boot sector 4 originally intended for storing the boot code (i.e. step 14), and allocates it into hard disk identification code area 2, protective procedure storage area 1, and backup partition table area 3; this step actually edits the original boot code (i.e. step 14), which adds the aforesaid steps (10)~(13) and (15)~(17) into the boot code. However, this method could cause damage to the original boot code and lead to the failure of hard disk, or cause the storage space of the master boot sector 4 between the jump area 6 and the partition table area 5 to become insufficient for storing the boot code, protective procedure storage area 1, hard disk identification code area 2, and backup partition table area 3. In another embodiment of the invention; as shown in FIG. 5 and FIG. 6, the step of the computer setting the hard disk as protected, and allocating at least hard disk identification code area 2, protective procedure storage area 1, and backup partition table area 3 in the hard disk according to application program is comprised of:

(40) in a storage space 80 of the master boot sector 4 originally intended for storing the boot code, establishing a calling area 81 in the remaining storage space after where the boot code is stored;

(41) locating an idle partition table 82 within the partition table area 5;

(42) writing an interrupt command (such as INT 13h of BIOS) and the starting address of the idle partition table 82 into the calling area 81;

(43) writing the address of an idle sector of the designated hard disk into the idle partition table 82, and using this idle sector as the new boot sector 9;

(44) sequentially establishing a new jump area 90, a hard disk identification code area 2, a backup partition table area 3, a boot code starting area 91, and a protective procedure storage area 1 in the new boot sector 9, as indicated in FIG. 6;

(45) writing a jump command (such as jmp) into the jump area 6, the command will jump to the starting address of the calling area 81 within the master boot sector 4;

(46) filling the jump command into the new jump area 90, the command will jump to the starting address of the protective procedure storage area 1 in the new boot sector 9;

(47) copying the computer identification code into the hard disk identification code area 2 to use it as the hard disk identification code;

(48) using the backup partition table area 3 as the storage space for storing all of the partition tables in the partition table area 5 as each of backup partition tables;

(49) storing the starting address of the protective procedure, hard disk identification code area 2, and backup partition table area 3 from the new boot sector 9 into the protective procedure storage area 1, as well as the starting address of the boot code starting area 91 within the master boot sector 4, and then finishing the overall process.

Figure 7:
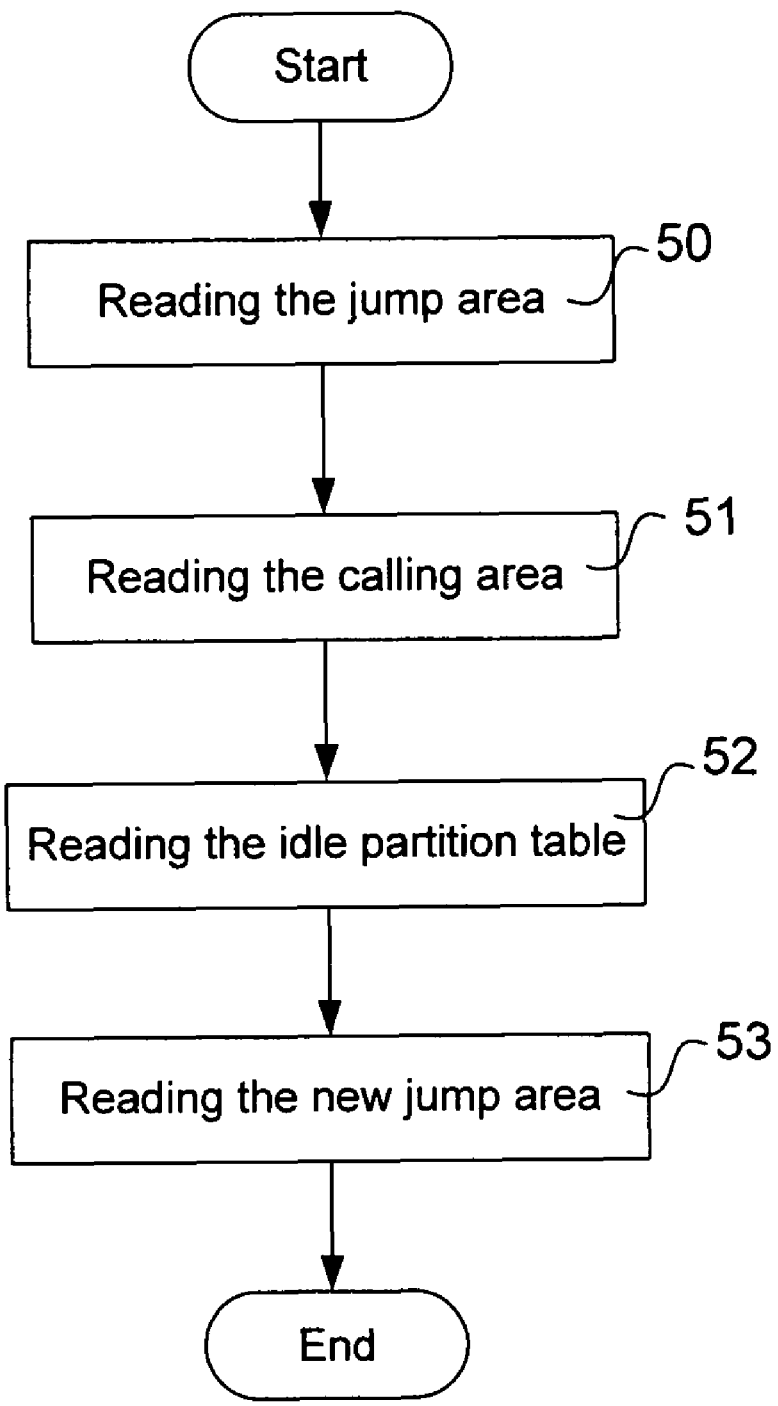
FIG. 7 shows the steps in reading the protective procedure according to another embodiment of the invention.

As indicated in the embodiment of FIG. 7, the step of the computer reading the protective procedure comprising:

(50) reading and executing the jump command of the jump area 6, in order to jump to the starting address of the calling area 81 within the master boot sector 4;

(51) reading the calling area 81 to use it to obtain the address of the idle partition table 82, when the execution of the step (52) is completed, the interrupt command is executed in order to load the new boot sector 9 into the main memory;

(52) reading the idle partition table 82 to obtain the address of the new boot sector 9 in the hard disk;

(53) reading the new jump area 90 to obtain the starting address of the protective procedure storage area 1 in the new boot sector 9, which is the equivalent of reading the protective procedure; executing the protective procedure according to the steps shown in FIG. 2.

Moreover, in the aforesaid embodiment; when the computer is executing the protective procedure, it reads the respective starting address of the hard disk identification code area 2 and backup partition table area 3 in the new boot sector 9, which is filled in by the protective procedure storage area 1, thereby reading the hard disk identification code and each of backup partition tables from the new boot sector 9, respectively.

Figure 8:
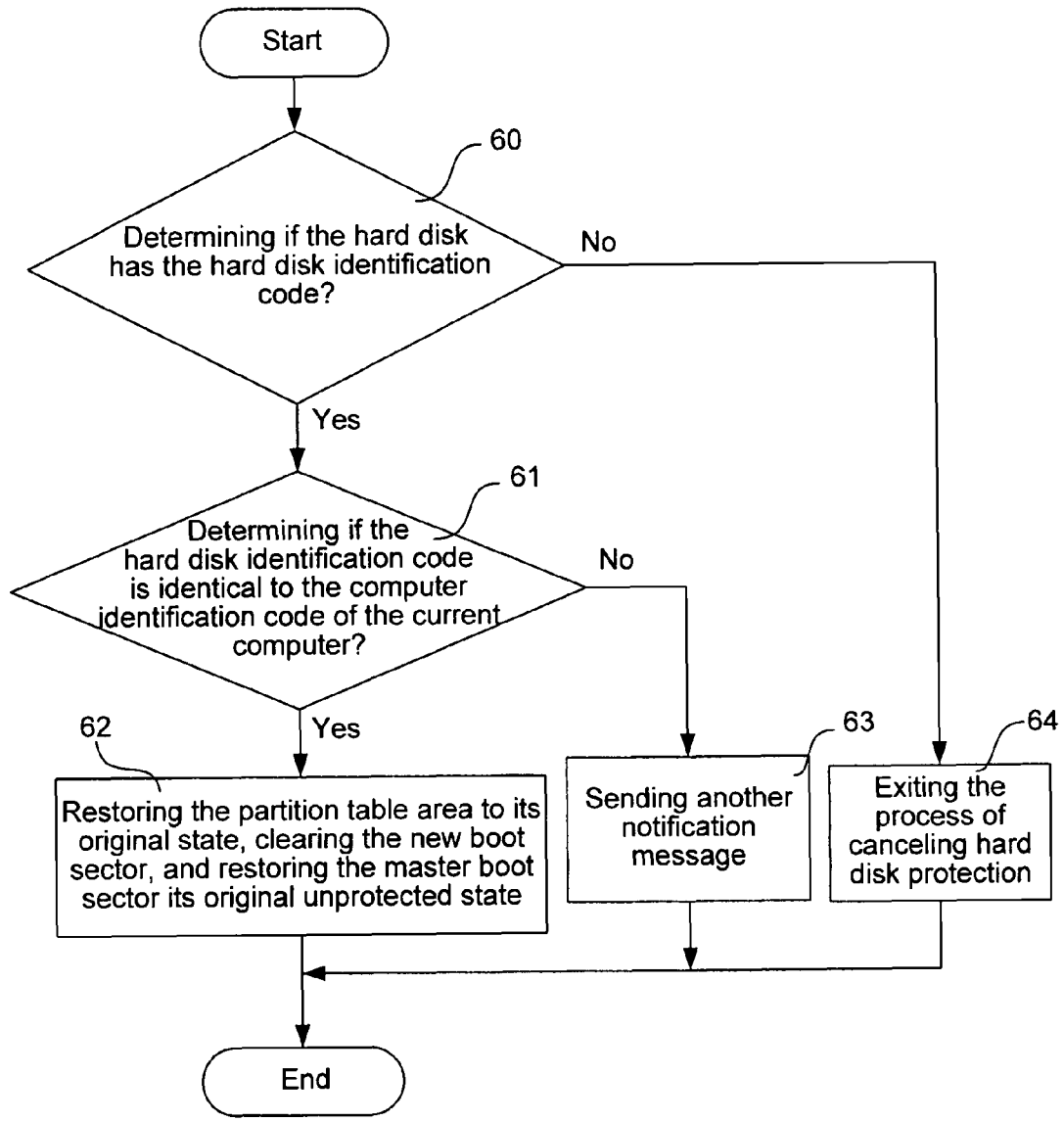
FIG. 8 shows the steps in canceling hard disk protection according to another embodiment of the invention.

In the embodiment shown in FIG. 8, the step of the computer canceling hard disk protection after the hard disk is set as protected according to application program is comprised of:

(60) determining if the hard disk has the hard disk identification code; if it does, the step (61) is carried out; otherwise the step (64) is carried out instead;

(61) determining if the hard disk identification code is identical to the computer identification code of current computer; if it is, the step (62) is carried out; otherwise the step (63) is carried out instead;

(62) copying each of backup partition tables in the backup partition table area 3 back into the partition table area 5 to restore the partition table area 5 to its original state, and clear the data written into the new boot sector 9, calling area 81, and idle partition table 82; and also writing the starting address of the boot code within the master boot sector 4 into the jump area 6; in other words, the master boot sector 4 is restored to its original unprotected state, and finishing the overall process;

(63) sending another message notifying that the clearing of the protective procedure storage area 1, hard disk identification code area 2, and backup partition table area 3 of the new boot sector 9 is not allowed, and finishing the overall process;

(64) exiting the process of canceling hard disk protection, and then finishing the overall process.

It should be noted that the computer does not edit the original boot code of the hard disk in any ways, but rather carries out the editing within the empty storage space of the hard disk. Therefore, this method significantly reduces the chance of damaging the boot code, and does not have the problem of insufficient storage space for storing the boot code, protective procedure storage area 1, hard disk identification code area 2, and backup partition table area 3.

Figure 9:
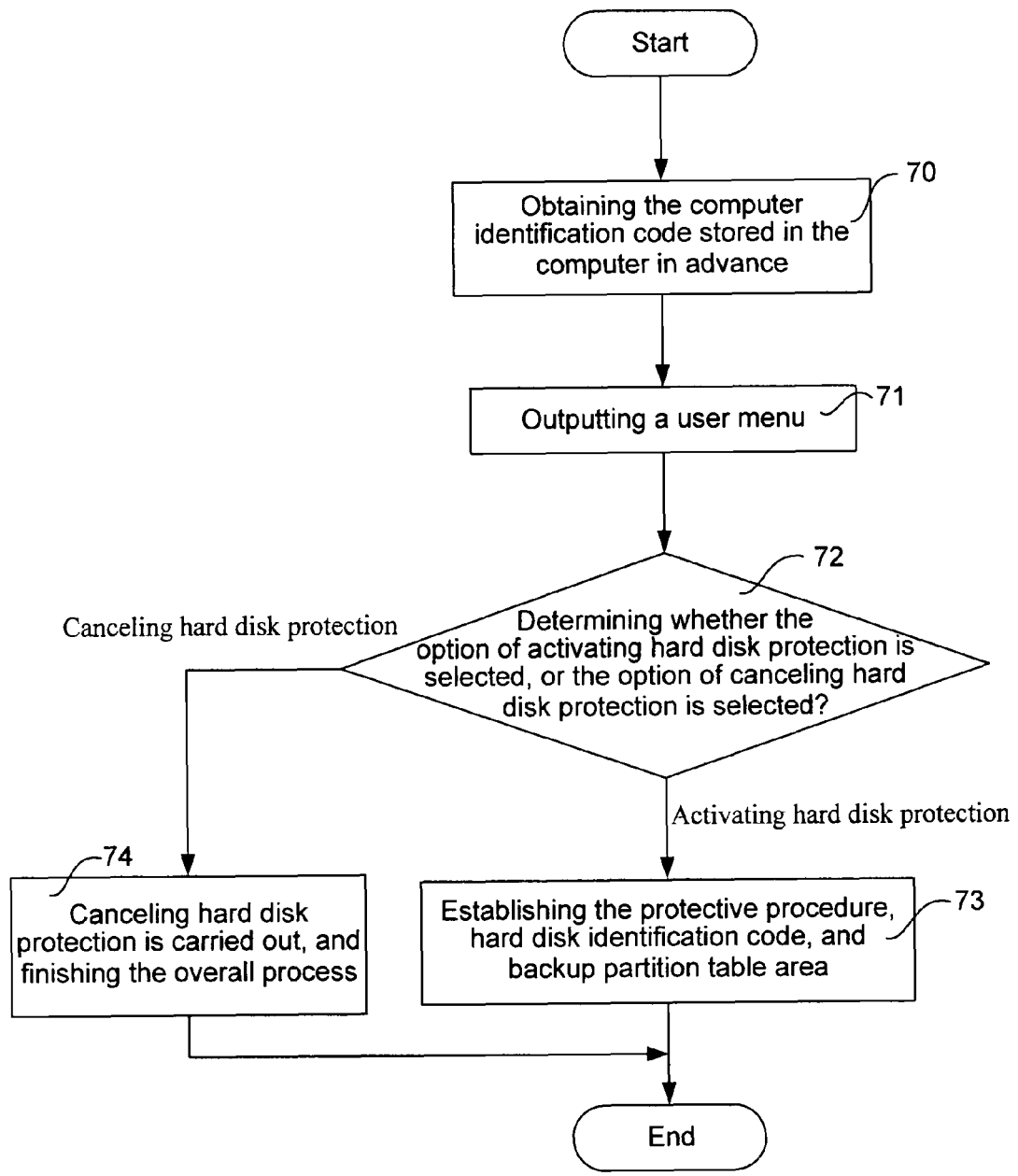
FIG. 9 shows the steps in setting hard disk as protected or unprotected according to the invention.

Referring to the embodiment shown in FIG. 9, the step of the computer setting hard disk as protected or canceling protection of hard disk according to application program is comprised of:

(70) obtaining the computer identification code stored in the computer in advance; as mentioned above, the computer identification code is a value from the universal unique identification field of type 1 System Management BIOS;

(71) outputting a user menu, which includes an option of activating hard disk protection and an option of canceling hard disk protection;

(72) determining whether the option of activating hard disk protection is selected, or the option of canceling hard disk protection is selected; if the option of activating hard disk protection is selected, the step (73) is carried out; otherwise it means the option of canceling hard disk protection is selected, and the step (74) is carried out instead;

(73) when the option of activating hard disk protection is selected, the step of establishing the protective procedure, hard disk identification code, and backup partition table area 3 (i.e. the steps shown in FIG. 5), and finishing the overall process.

(74) when the option of canceling hard disk protection is selected, the step of canceling hard disk protection is carried out (i.e. the steps shown in FIG. 8), and finishing the overall process.

In summary, after the computer executing the application program, users are allowed to choose between setting the hard disk as protected or unprotected. Once the hard disk is set as protected, only the computer that was used to set the hard disk as protected is allowed to read the partition table in the partition table area 5, and not any other computers. The computers that were not used to set the hard disk as protected cannot read the partition table in the partition table area 5, which helps achieve the purpose of protecting the data of hard disk.

While the invention herein disclosed has been described by means of specific embodiments, numerous modifications and variations could be made thereto by those skilled in the art without departing from the scope and spirit of the invention set forth in the claims.

What is claimed is:

1. A method for protecting data in a hard disk, which is applied to said hard disk set to be protected by a computer, comprising:

establishing a protective procedure storage area, a hard disk identification code area, and a backup partition table area between a jump area and a partition table area in a master boot sector of said hard disk, wherein a boot code is stored in said master boot sector;

writing a starting address of said protective procedure storage area within said master boot sector into said jump area;

copying a computer identification code of said computer into said hard disk identification code area to serve as a hard disk identification code;

enabling said backup partition table area to serve as a storage space for storing all partition tables in said partition table area as backup partition tables respectively;

writing a protective procedure and starting addresses of said hard disk identification code area and said backup partition table area within said master boot sector respectively into said protective procedure storage area;

reading and executing said protective procedure when said computer completes BIOS POST process;

reading said hard disk identification code stored in said hard disk identification code area;

determining whether or not said hard disk identification code is identical to a computer identification code of said computer;

when said hard disk identification code is identical to said computer identification code of said computer, determining whether or not said partition table area is cleared;

when said partition table area is cleared, copying each of said backup partition tables stored in said backup partition table area to said partition table area to serve as a partition table of said hard disk respectively; and executing said boot code stored in said master boot sector to complete an initialization of an operating system of said computer.

2. The method of claim 1, wherein the step of reading said protective procedure by said computer comprises the steps of:

reading said jump area in advance to obtain the starting address of said protective procedure storage area within said master boot sector; and then reading said protective procedure.

3. The method of claim 1, wherein when said protective procedure is executed by said computer, further comprises the step of reading the starting address of said hard disk identification code area and said backup partition table area within said master boot sector written in said protective procedure storage area, so as to obtain said hard disk identification code and each of said backup partition tables.

4. The method of claim 1, wherein after said hard disk is set to be protected, further comprising the following steps for canceling the protection of said hard disk:

determining whether or not said hard disk has said hard disk identification code;

when said hard disk has said hard disk identification code, determining whether or not said hard disk identification code is identical to said computer identification code of current computer; and when said hard disk identification code is identical to said computer identification code, copying each of the backup partition tables of said backup partition table area back into the partition table area, so as to restore the status of said partition table area, clear the protective procedure storage area, hard disk identification code area and backup partition table area, and keep the boot code for restoring the master boot sector to the original unprotected status.

5. The method of claim 4, wherein when said hard disk has said hard disk identification code, and said hard disk identification code is not identical to said computer identification code of current computer, further comprises the step of sending out another message to notify that the protective procedure storage area, hard disk identification code area, and backup partition table area of the master boot sector is not allowed to be cleared.

6. The method of claim 4, wherein when said hard disk does not have said hard disk identification code, further comprises the step of canceling the procedure for restoring said hard disk to the original unprotected status.

7. The method of claim 4, wherein when said hard disk is set to be protected or unprotected by the computer according to an application program, further comprises:

obtaining said computer identification code stored in said computer in advance;

outputting a user menu, which includes an option of activating hard disk protection and an option of canceling hard disk protection;

determining whether or not the option of activating hard disk protection is selected, or the option of canceling hard disk protection is selected; and when the option of activating hard disk protection is selected, sequentially establishing said protective procedure storage area, said hard disk identification code area, and said backup partition table area.

8. The method of claim 7, wherein when the option of canceling hard disk protection is selected, further comprises the step of canceling protection of said hard disk.

9. A method for protecting data in a hard disk, which is applied to said hard disk set to be protected by a computer, comprising:

establishing a calling area within a master boot sector of said hard disk, wherein a boot code is stored in said master boot sector;

locating an idle partition table from a partition table area of said hard disk;

writing addresses of said idle partition table and interrupt command into said calling area;

writing address of an idle sector designated in said hard disk into said idle partition table, and using said idle sector as a new boot sector;

establishing a jump area, a hard disk identification code area, a backup partition table area, a boot code starting area, and a protective procedure storage area in said new boot sector;

writing starting address of said calling area within said master boot sector into said jump area;

writing starting address of said protective procedure storage area within said new boot sector into said jump area, and copying a computer identification code of said computer into said hard disk identification code area to serve as a hard disk identification code;

setting said backup partition table area to save all partition tables in said partition table area as backup partition tables respectively;

setting said protective procedure storage area to save a protective procedure, starting addresses of said hard disk identification code area and said backup partition table area within said new boot sector, and starting address of said boot code starting area within said new boot sector;

reading and executing said protective procedure when said computer completes BIOS POST process;

reading said hard disk identification code stored in said hard disk identification code area;

determining whether or not said hard disk identification code is identical to said computer identification code of said computer;

when said hard disk identification code is identical to said computer identification code of said computer, determining whether or not said partition table area is cleared;

when said partition table area is cleared, copying each of said backup partition tables stored in said backup partition table area to said partition table area to serve as a partition table of said hard disk respectively; and executing said boot code stored in said master boot sector to complete an initialization of an operating system of said computer.

10. The method of claim 9, wherein when said protective procedure is read by said computer, further comprises:

reading said jump area to obtain the starting address of said calling area within said master boot sector;

reading said calling area to obtain the address of said idle partition table;

reading said idle partition table to obtain the address of said new boot sector in the hard disk, and executing the interrupt command in order to read said new boot sector from said hard disk into a main memory; and reading said jump area to obtain the starting address of said protective procedure storage area in said new boot sector, thereby reading said protective procedure.

11. The method of claim 9, wherein when said protective procedure is executed by said computer, further comprises the steps of:

reading the starting address of said hard disk identification code area and said backup partition table area in said new boot sector filled in by said protective procedure storage area; and reading said hard disk identification code and each of said backup partition tables from said new boot sector.

12. The method of claim 9, wherein after said hard disk is set to be protected, further comprises the following step for canceling the protection of said hard disk:

determining whether or not said hard disk has said hard disk identification code;

when said hard disk has said hard disk identification code, determining whether or not said hard disk identification code is identical to sal computer identification code of said computer; and when said hard disk identification code is identical to said computer identification code of said computer, restoring said master boot sector to an original unprotected state.

13. The method of claim 12, wherein when said master boot sector is restored to said original unprotected state, further comprises:

copying each of said backup partition tables in said backup partition table area back into said partition table area, so as to restore said partition table area, clear data written into said new boot sector, calling area and idle partition table, and write the starting address of said boot code within said master boot sector into said jump area.

14. The method of claim 12, wherein when said hard disk has said hard disk identification code, and said hard disk identification code is not identical to said computer identification code of said computer, further comprises the step of sending another message to notify that said protective procedure storage area, hard disk identification code area and backup partition table area in said new boot sector is not allowed to be cleared.

15. The method of claim 12, wherein when said hard disk does not have said hard disk identification code, further comprises the step of canceling the procedure for restoring said hard disk to said original unprotected status.

16. The method of claim 12, wherein when said hard disk is set to be protected or unprotected by said computer according to an application program, further comprises:

obtaining said computer identification code stored in said computer in advance;

outputting a user menu, which includes an option of activating hard disk protection and an option of canceling hard disk protection;

determining whether or not the option of activating hard disk protection is selected, or the option of canceling hard disk protection is selected; and when the option of activating hard disk protection is selected, sequentially establishing said protective procedure storage area, said hard disk identification code area, and said backup partition table area.

17. The method of claim 16, wherein when the option of canceling hard disk protection is selected, further comprises the step of canceling protection of said hard disk.

* * * * *